United States Patent [19]

Bordner

[11] Patent Number: 4,980,006
[45] Date of Patent: Dec. 25, 1990

[54] METHOD FOR MAKING A FIBER-REINFORCED PIPE FLANGE

[75] Inventor: Dalton W. Bordner, Fullerton, Calif.

[73] Assignee: Ameron, Inc., Monterey Park, Calif.

[21] Appl. No.: 427,324

[22] Filed: Oct. 25, 1989

Related U.S. Application Data

[62] Division of Ser. No. 119,387, Nov. 6, 1987, Pat. No. 4,900,072.

[51] Int. Cl.⁵ .................. F16L 47/00; B65H 81/00
[52] U.S. Cl. .................... 156/171; 156/173; 156/175; 156/189; 156/190; 285/423
[58] Field of Search ........... 156/171, 173, 189–191, 156/172, 175, 169, 166; 285/405, 423, 363, 229; 138/109; 403/335, 337

[56] References Cited

U.S. PATENT DOCUMENTS

| | | | |
|---|---|---|---|
| 3,224,795 | 12/1965 | Conely | 285/423 X |
| 3,363,918 | 1/1968 | Fisher | 285/423 X |
| 3,796,449 | 3/1974 | McLaughlin et al. | 285/405 |
| 3,920,049 | 11/1975 | Lippert et al. | 285/403 X |
| 4,065,339 | 12/1977 | Lippert et al. | 285/405 X |
| 4,217,935 | 8/1980 | Grendelman et al. | 138/109 |
| 4,234,368 | 11/1980 | Schwarz | 156/189 X |
| 4,236,735 | 12/1980 | Allen | 285/423 X |
| 4,241,944 | 12/1980 | Clark | 285/229 |
| 4,256,525 | 3/1981 | Allen | 285/423 X |
| 4,317,693 | 3/1982 | Reed | 285/423 X |
| 4,329,193 | 5/1982 | Sznopek et al. | 285/423 X |
| 4,330,016 | 5/1982 | Grendelman et al. | 285/405 X |
| 4,403,796 | 9/1983 | Ledbetter et al. | 285/405 X |
| 4,421,202 | 12/1983 | Hoy | 138/174 X |
| 4,559,249 | 12/1985 | Arigaya et al. | 285/409 X |
| 4,619,470 | 10/1986 | Overath et al. | 285/423 X |
| 4,813,457 | 3/1989 | Offringa et al. | 285/405 |
| 4,902,201 | 2/1990 | Neubert | 156/189 X |

FOREIGN PATENT DOCUMENTS 952739  3/1964  United Kingdom ............... 285/229

Primary Examiner—Michael W. Ball
Assistant Examiner—Jeff H. Aftergut
Attorney, Agent, or Firm—Christie, Parker & Hale

[57] ABSTRACT

A technique for forming a pipe flange having radial reinforcement in at least the annular portion of the bolt circle uses a specially woven band of fibers. The woof fibers in the band are longer than the width of the warp fibers so that as the band is wound into the slot of a mandrel, the tails of the woof fibers bend and extend in a radial direction.

8 Claims, 2 Drawing Sheets

METHOD FOR MAKING A FIBER-REINFORCED PIPE FLANGE

This is a division of application Ser. No. 07/119,387 filed Nov. 6, 1987 now U.S. Pat. No. 4,900,072.

BACKGROUND OF THE INVENTION

This invention concerns fiber reinforcement of a flange for fiber reinforced pipe.

There is a substantial market for pipe made by winding glass fibers coated with a plastic material around a mandrel and curing the resin. Such fiber-reinforced plastic pipe is lightweight, has high burst strength, and by choice of suitable plastic resins, can be quite resistant to attack by the materials carried in the pipe or the environment in which the pipe is used. Various polyester resins, epoxy resins and the like may be used. The types of resins or fibers employed in practice of this invention are not material, and glass fiber, epoxy resin and the like mentioned herein are merely exemplary.

Glass fiber reinforced pipe sections may be secured end to end or to pipe fittings, valves, or the like, by bolts connected to flanges on the pipe. It is conventional to form pipe flanges separately from the reinforced pipe. Such a flange is a generally flat plate with a central hole and a bolt circle having a plurality of bolt holes extending circumferentially around the flange. Such a separately manufactured flange is then adhesively bonded around the end of a section of pipe. Two such flanges may then be bolted together to interconnect pipe sections.

Although nominally a flat plate, a central hub may be formed around the hole through the flange to enlarge the area for adhesive bonding to the pipe. Various grooves, seal rings and the like may be provided on the mating faces of such flanges for sealing the joint. Such geometric details of the pipe flange are not material to practice of this invention which relates to the fiber reinforcement of the flange.

It has been the practice to form such pipe flanges by winding resin impregnated rovings of glass fibers in a circumferential "slot" of a mandrel A plurality of such rovings are gradually built up by rotating the mandrel until the slot is filled to the desired depth. After the plastic resin is cured, the flange is stripped from the mandrel for final machining. This machining typically involves turning the circumference, primarily for appearance and drilling a plurality of bolt holes in circle between the central hole and the circumference of the flange. It is also feasible to machine sealing rings or grooves on the face of the flange.

Sometimes a problem is encountered with flanges made by wrapping rovings of fiber around a mandrel. When the holes are drilled for the bolt circle, superficial cracks may appear in the bolt holes or on the surfaces of the flange between the bolt holes, probably due to shrinkage stresses built up from curing of the resin. This may also occur when bolts are over torqued in the holes Testing has shown that such cracks do not adversely affect the flange's performance, however, customers unfamiliar with this information object to the cracks and may reject parts showing them. Thus, although the cracks are essentially "cosmetic" and may not harm the product in service, they may not be acceptable to prospective customers.

It is, therefore, desirable to provide pipe flanges with appropriate reinforcement for preventing the formation of such cracks.

BRIEF SUMMARY OF THE INVENTION

There is, therefore, provided in practice of this invention, a fiber-reinforced, nominally flat pipe flange comprising a multiplicity of fibers in at least an annular portion of the flange having a central portion extending longitudinally through the flange and an end portion extending radially outwardly at each face of the flange. Such a flange may be made by winding reinforcing fibers in a circumferentially extending slot in a mandrel with at least a portion of the reinforcing fibers being woof fibers in a band of warp fibers no wider than the slot, the woof fibers being longer than the width of the slot and having ends extending beyond the edge of the band of warp fibers.

DRAWINGS

These and other features and advantages of this invention will be appreciated upon consideration of the following detailed description when considered in connection with the accompanying drawings wherein.

DESCRIPTION

Figure 1:
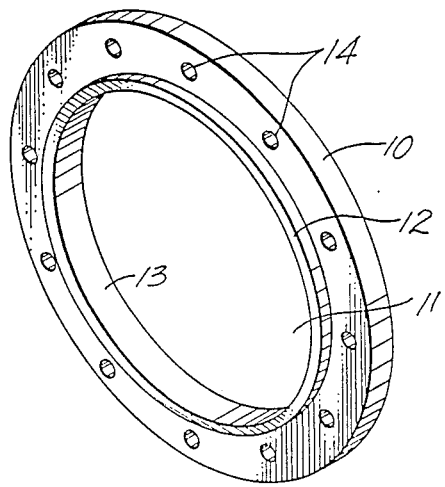
FIG. 1 illustrates a isometrically an exemplary pipe flange constructed according to principles of this invention.

FIG. 1 illustrates an exemplary pipe flange constructed according to principles of this invention. Such a flange is a nominally flat annular plate 10 having a central hole 11. A typical flange may not be completely flat and include a hub 12 which increases the thickness or "length" of the flange adjacent to the central hole. Such a hub provides a bonding surface 13 longer than the principal thickness of the flange for better adhesive bonding around the end of a fiber-reinforced pipe (not shown). The opposite face of the flange (hidden in FIG. 1) may have conventional sealing rings, 0-ring grooves or the like for sealing the flange to an adjacent flange on another section of pipe. A plurality of holes 14 form a bolt circle for bolting two flanges together.

The external configuration of a typical flange as illustrated in FIG. 1 is conventional. Such flanges may range from a few inches to a few feet in diameter.

Such a flange is conventionally formed by winding resin impregnated glass rovings into a circumferentially extending slot 16 in a mandrel 17 of suitable dimensions. Such glass rovings are essentially an untwisted yarn of a large number of fibers of glass or other reinforcing material commercially available in large spools. In a typical winding operation the rovings are pulled through a bath of liquid resin and gradually wound into the slot in the mandrel to effectively fill the entire cross section of the slot out to the desired diameter of the flange being made. The resin is then cured on the mandrel, such as by heating, or in the case of some catalyzed resins, by simply holding at ambient temperature until sufficiently rigid to be removed from the mandrel without damage. The parts of the mandrel are coated with a conventional release agent to prevent adhesion of the resin to the mandrel parts so that the completed flange can be easily stripped from the mandrel.

Figure 2:
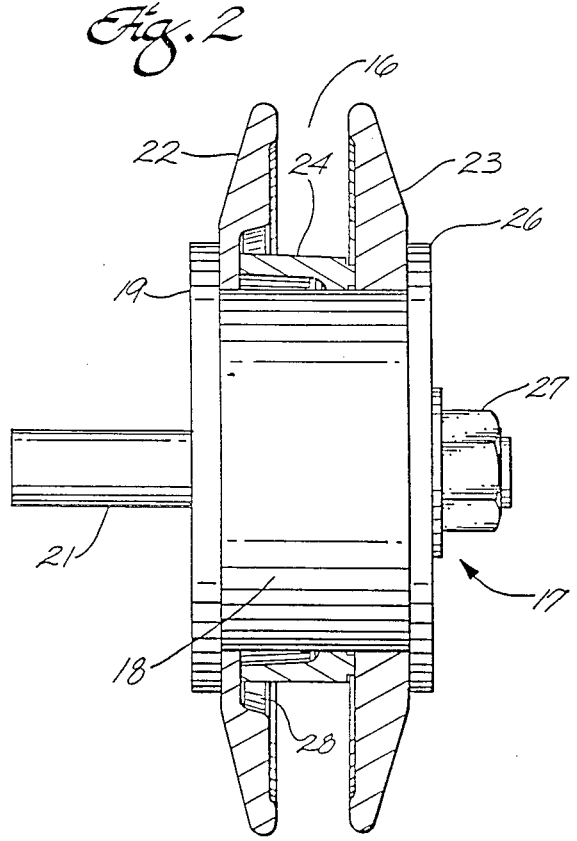
FIG. 2 is a partial transverse cross section of a mandrel on which such a pipe flange can be wound.

The exemplary mandrel illustrated in FIG. 2 comprises a central drum 18 with a flange 19 at one end. The drum is mounted on a shaft 21 used for mounting and rotating the mandrel A rear face plate 22 bears against the flange 19. The rear face plate is spaced apart from a front face plate 23 by an annular core 24. The two face plates and core are held in position on the drum by a bearing plate 26 and secured by a nut 27. The two faces of the flange are defined by the two face plates. The rear face plate has an undercut 28 for defining a hub on the flange. The central hole of the flange is defined by the core 24.

It should be recognized that although the mandrel illustrated in FIG. 2 has but a single slot for forming a flange, similar mandrels may be employed with a plurality of slots so that several flanges can be wound simultaneously. Although illustrated for a relatively small diameter flange, it will be apparent that similar mandrels may be used for larger flanges. Also, ridges or grooves may be formed on the front face plate to provide sealing structures on the face of the flange.

When a flange is wound solely with glass rovings, the reinforcing fibers in the flange extend circumferentially, and there is essentially no reinforcement extending in the radial direction. The cosmetic cracking tends to extend in the circumferential direction and addition of radial reinforcement should largely prevent such cracking It has previously been extremely difficult to orient reinforcing fibers in the radial direction. For example, when a standard fabric wider than the slot in the mandrel is wound circumferentially, it wrinkles and folds over itself instead of extending radially. This may actually aggravate the problem by leaving gaps between the wrinkles and folds with essentially no reinforcement.

Figure 3:
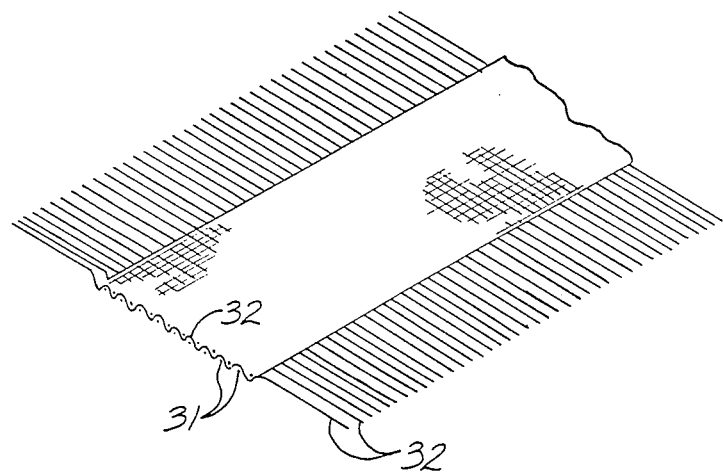
FIG. 3 is a perspective view of a band of fibers useful for winding such a pipe flange.

This problem can be solved by winding at least a portion of the flange with a band of specially woven fabric of reinforcing fibers. A fragment of such a band is illustrated in FIG. 3. The central portion of the band has longitudinally extending warp fibers 31 and transversely extending fibers 32 commonly referred to as fill, woof, or weft fibers In this embodiment the woof fibers have "tails" extending beyond the width of the band of warp fibers. Thus the band comprises a multiplicity of short woof fibers held captive by warp fibers in their central portion and having free ends extending beyond the warp fibers. A fairly loose weave is sufficient for carrying the woof fibers.

Figure 4:
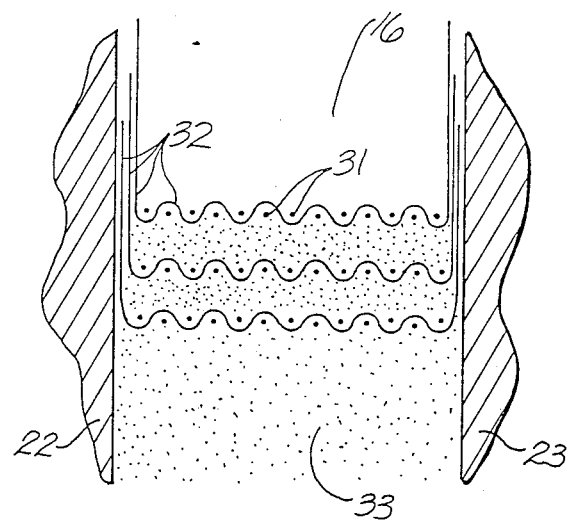
FIG. 4 is a fragmentary schematic cross section through the slot of a mandrel as reinforcing fibers are wound into the slot.

In fabricating an exemplary flange, resin impregnated reinforcing fiber rovings 33 are wound into the slot 16 between the face plates 22 and 23 of a mandrel (FIG. 4). Such fiber rovings are used near the inner diameter of the flange since they are rather inexpensive and easily wound. And in that region cracking is not normally a problem. When a desired thickness of rovings have been built up in the slot, and the diameter approaches that of the bolt circle where cracking may occur, a band of the special fabric is wound into the slot The band may be drawn through a bath of liquid resin before being wound into the slot or it may be wound dry while interleaved between resin impregnated rovings. Such resin may squeeze into the fabric and be sufficient for fabricating a flange.

The width of the band of warp fibers forming the central portion of the woven band is about the same as the width of the slot in which it is wound It should be no wider than the slot so as not to wrinkle or fold adjacent its edges. The tails of woof fibers extending beyond the band of warp fibers are wider than the slot.

As the band is pulled down into the slot during winding the tails engage the faces of the slot and flare outwardly along the face of the slot like spokes on a wheel. Such radially extending fibers provide radial reinforcement to the completed flange The ends of the fibers do not necessarily extend exactly radially which is immaterial. Their principal length is, however, in the radial direction. It will also be noted that some of the fibers at the face plates may be bent and pulled away from the face by subsequent wrappings of rovings and/or layers or fabric. Everything is fairly sticky when winding resin impregnated rovings and the like and the tails tend to stick temporarily to the face plates and remain largely extending in a radial direction when the flange is completely wound.

After the annular region of the bolt circle has been passed with such windings, the balance of the flange may be wound with rovings of fibers in a conventional manner. The balance of the curing of the plastic resin, stripping of the flange from the mandrel, and machining operations can be conducted in a conventional manner.

It will be noted that each of the short woof fibers extends in a generally U-shaped path with the central portion extending from face-to-face of the flange, and each end portion extending generally radially outwardly adjacent a face of the flange These radially extending fibers provide sufficient radial reinforcement to prevent the minor cracking sometimes found in the bolt circles of fiber-reinforced flanges.

In one example, 20-inch glass fiber reinforced epoxy flanges were wound, cured, machined, and drilled as described. No cracks were found in the bolt holes or on either face of the flanges. One of these flanges was mounted on a 20-inch mitered tee using conventional adhesives and subsequently tested to 500 psi without any evidence of cracks.

In the embodiment described, a woven band of fabric with reinforcing warp fibers and laterally ends of woof fibers was used for forming a flange. An alternative band of woof fibers carried by a commercially available non-reinforcing warp may also be employed Such bands comprise bundles of short woof fibers carried by a few warp strands of non-reinforcing fiber such as nylon knitted for holding the bundles of woof fibers. Such a knitted carrier warp and loosely held bundles of woof fibers has appreciable flexibility for winding onto nonflat surfaces. Such a material may be used in lieu of the woven fabric for forming a pipe flange when interleaved with reinforcing glass fibers.

Many other modifications and variations will be apparent to one skilled in the art. It is, therefore, to be understood that within the scope of the appended claims the invention may be practiced otherwise than as specifically described.

What is claimed is:

1. A method for forming a fiber-reinforced annular pipe flange comprising the step of:

placing a plurality of fibers in a circumferentially extending slot in a mandrel, each of the fibers having a central portion having means for carrying the fibers, each fiber extending transversely in the slot between opposite faces of the slot and having an end portion without warp fibers extending in a radial direction adjacent to each face of the slot.

2. A method as recited in claim 1 wherein the placing step comprises carrying the fibers into the slot in a band of warp fibers sufficiently narrow that the ends of the placed fibers extend beyond the edges of the band of warp fibers.

3. A method as recited in claim 1 comprising interleaving layers of circumferentially extending reinforcing fibers between adjacent layers of transversely extending portions of the placed fibers.

4. A method as recited in claim 1 wherein the placing step comprises weaving a band of warp fibers having a width no more than the width of the slot and a multiplicity of woof fibers having a length greater than the width of the slot, and circumferentially winding the band in the slot so that the ends of the woof fibers extend in a radial direction.

5. A method as recited in claim 4 further comprising interleaving rovings of circumferentially extending reinforcing fibers between adjacent layers of the woven band.

6. A method for forming a fiber-reinforced annular plate comprising the step of:
   winding reinforcing fibers in a circumferentially extending slot in a mandrel, at, least a portion of the reinforcing fibers being woof fibers in a band of warp fibers no wider than the slot, the woof fibers being longer than the width of the slot and having ends extending beyond the edge of the band of warp fibers.

7. A method as recited in claim 6 wherein the ends of the fibers extend in a radial direction on each face of the slot.

8. A method as recited in claim 7 further comprising interleaving a layer of circumferentially extending reinforcing rovings between adjacent layers of the band of fibers.

* * * * *